(12) United States Patent
Guo et al.

(10) Patent No.: US 10,190,045 B2
(45) Date of Patent: Jan. 29, 2019

(54) NANO-COMPOSITE STRUCTURE AND PROCESSES MAKING OF

(71) Applicants: Xiaomei Guo, West Roxbury, MA (US); Kewen Kevin Li, Andover, MA (US); Yingyin Kevin Zou, Lexington, MA (US); Hua Jiang, Sharon, MA (US)

(72) Inventors: Xiaomei Guo, West Roxbury, MA (US); Kewen Kevin Li, Andover, MA (US); Yingyin Kevin Zou, Lexington, MA (US); Hua Jiang, Sharon, MA (US)

( * ) Notice: Subject to any disclaimer, the term of this patent is extended or adjusted under 35 U.S.C. 154(b) by 0 days.

(21) Appl. No.: 14/988,659

(22) Filed: Jan. 5, 2016

(65) Prior Publication Data

US 2017/0190970 A1    Jul. 6, 2017

(51) Int. Cl.
| | |
|---|---|
| *C09K 11/77* | (2006.01) |
| *C03C 1/00* | (2006.01) |
| *C03C 17/25* | (2006.01) |
| *C04B 35/468* | (2006.01) |
| *C04B 35/47* | (2006.01) |
| *C04B 35/472* | (2006.01) |
| *C04B 35/491* | (2006.01) |
| *C04B 35/499* | (2006.01) |
| *C04B 35/622* | (2006.01) |
| *C04B 35/80* | (2006.01) |

(52) U.S. Cl.
CPC ......... *C09K 11/7769* (2013.01); *C03C 1/008* (2013.01); *C03C 17/25* (2013.01); *C04B 35/4682* (2013.01); *C04B 35/47* (2013.01); *C04B 35/472* (2013.01); *C04B 35/491* (2013.01); *C04B 35/499* (2013.01); *C04B 35/62218* (2013.01); *C04B 35/803* (2013.01); *C03C 2217/23* (2013.01); *C03C 2218/113* (2013.01); *C04B 2235/3236* (2013.01); *C04B 2235/3249* (2013.01); *C04B 2235/3255* (2013.01); *C04B 2235/76* (2013.01); *C04B 2235/768* (2013.01); *C04B 2235/781* (2013.01); *C04B 2235/785* (2013.01); *C04B 2235/9653* (2013.01)

(58) Field of Classification Search
CPC ............... C09D 133/14; C09D 133/08; G02F 1/133308; G02F 1/13338; G02F 2001/133311; G02F 1/133711; G02F 1/13718
See application file for complete search history.

(56) References Cited

U.S. PATENT DOCUMENTS

| | | |
|---|---|---|
| 5,420,080 A | 5/1995 | Wang |
| 5,492,776 A | 2/1996 | Paz-Pujalt |
| 5,545,595 A | 8/1996 | Wang |
| 5,955,388 A | 9/1999 | Dejneka |
| 7,008,559 B2 | 3/2006 | Chen |
| 7,088,040 B1 | 8/2006 | Ducharme |
| 7,550,201 B2 | 6/2009 | van Veggel et al. |
| 2013/0229465 A1* | 9/2013 | Fujii ............... B41J 2/14233 347/72 |

OTHER PUBLICATIONS

Tunaboylu et al. "Phase transformation kinetics in Pb0,91La0.09Zr0.65Ti0.35O3 films" Journal of Materials Science Letters 17 (1998) 1445-1447.*

* cited by examiner

*Primary Examiner* — Cheng Yuan Huang
(74) *Attorney, Agent, or Firm* — BainwoodHuang

(57) ABSTRACT

A nano-composite structure comprises of an amorphous matrix with embedded nano-crystallites. The nano-crystallites are precipitated from the amorphous matrix via heat treatment of a solution mixture of metal salts or metalorganic compounds to an appropriate temperature range and with a suitable duration, or heating of a mixture of non-crystalline compounds. The nano-crystallites are self-assembled in the amorphous matrix without forming agglomerates or distinguished grain boundaries. The nano-composite structure can be used for transparent display, transparent optical ceramics, protection armor, nuclear protection, pulsed power, high voltage electronics, high energy storage system and high power microwave systems.

16 Claims, 9 Drawing Sheets

NANO-COMPOSITE STRUCTURE AND PROCESSES MAKING OF

STATEMENT OF GOVERNMENTAL INTEREST

This invention was made with Government support in whole or in part, under U.S. Army Aviation and Missile Command grants No. W31P4Q-10-C-0137. The government has certain rights in this invention.

BACKGROUND OF THE INVENTION

1. Technical Field

The present invention relates to a novel nano-composite structure, which consists of an amorphous matrix with embedded nano-crystallites. The nano-composite structure features high density, low grain boundary volume and no voids, in a bulk or film format, for a wide range of applications. Present invention is especially important in certain technology areas, such as transparent optical ceramics, transparent display, protection armor, nuclear protection, pulsed power, high voltage electronics, high energy storage system, and high power microwave systems. It also relates to processes to fabricate the said structure.

2. Technical Background

Nano-composite materials have been recognized as having tremendous potential in many technical sections owning to their unique and/or superior physical properties to those of the corresponding bulk or nanocrystalline materials. In general, pre-produced nano-crystallites are mixed into polymer or glass matrix to form the nanocomposite structure. However, there are some big technical challenges in processing of the nanocomposite structures to meet various technical requirements, e.g., a material with low defect microstructure, which is very important for many applications, such as transparent optical ceramics, protection armor, nuclear protection, high voltage applications, pulsed power, high energy storage system, high power microwave systems, power electronics, etc.

One of the biggest concerns is the level of agglomeration of the pre-made nano-crystallites, because of the extremely small particle size and hence the large surface area, the nano-crystallites tend to form agglomerates to reduce surface energy, that lead to undesired material defects and processing complications, which certainly affect the material performance. The differences in chemical, optical and/or mechanical properties between the matrix and the nano-crystallites can also produce issues in certain area of applications. For instance, a large variation in optical index between matrix and nano-crystallites lower the transparency of the nano-composite materials.

This invention solves the problems involving precipitating nano-crystallites in an amorphous matrix to form a nanocomposite structure, in which the nano-crystallites are precipitated from the matrix and are self-assembled without forming agglomerates or clear grain boundaries.

The amorphous matrix and the nano-composite structure can be formed in a bulk of thin film format, by heating of a solution mixture of metal salts or metalorganic compounds, or a mixture of non-crystalline compounds, at relatively low temperatures. The mild processing conditions are especially beneficial in terms of lowering cost or making possible of non noble electrodes in subsequential processing of electronics.

The nano-composite structure, instead of a frilly crystalized ceramic one, features low grain boundary volume and few voids. Those are very important characteristics for a wide range of applications. Grain boundaries in polycrystalline materials, structural mismatches in the interfaces, and voids due to impropriate processing are the sources for defects.

The nano-composite structure can possess superior electrical, mechanical and optical properties because of the absence of grain boundaries that could act as scattering sources and energy traps, or cause electrical breakdown. Excellent optical properties of the nano-composite thin films, including high transparency (>80% in visible range), bright upconverting luminescence, and smooth surface, have been demonstrated.

SUMMARY OF THE INVENTION

One aspect of the invention relates to a nano-composite structure comprising of an amorphous matrix with embedded nano-crystallites.

Yet another aspect of the invention relates to a nano-composite structure without clear crystalline grain boundaries.

Yet another aspect of the invention relates to a transparent nano-composite structure, which is transparent in a certain wavelength range.

Yet another aspect of the invention relates to a visible transparent nano-composite structure for transparent display applications.

Another aspect of the invention relates to processes to fabricate the said nano-composite structure.

The said amorphous matrix is produced through heat treatment of a solution mixture of metal salts or metal-organic compounds to an appropriate temperature and with a suitable duration.

Therefore the said nano-crystallites and the said matrix possess almost the same chemical elements and refractive index.

Yet another aspect of the invention relates to use the above mentioned nano-composite structure for applications such as transparent display, transparent optical ceramics, protection armor, nuclear protection, high voltage electronics, pulsed power, high energy storage system, high power microwave systems, but not limited to.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings are not necessarily to scale. The drawings illustrate one or more embodiment(s) of the invention, and together with the description serve to explain the principles and operations of the invention.

DETAILED DESCRIPTION OF THE PREFERRED EMBODIMENTS

Figure 1:
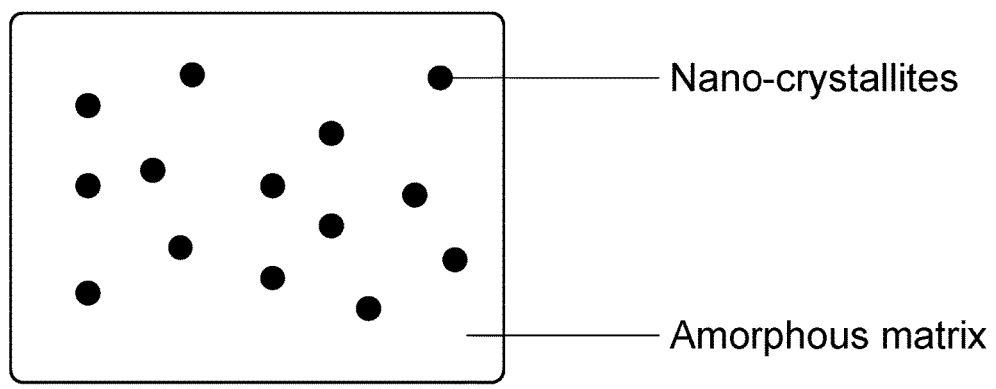
FIG. 1 is a schematic diagram illustrating of a nano-composite structure in accordance with the present invention.

Shown in FIG. 1 is a preferred embodiment according to the present invention. The nano-composite structure is comprising of an amorphous matrix with embedded nano-crystallites, which are precipitated and self-assembled in the matrix.

Figure 2:
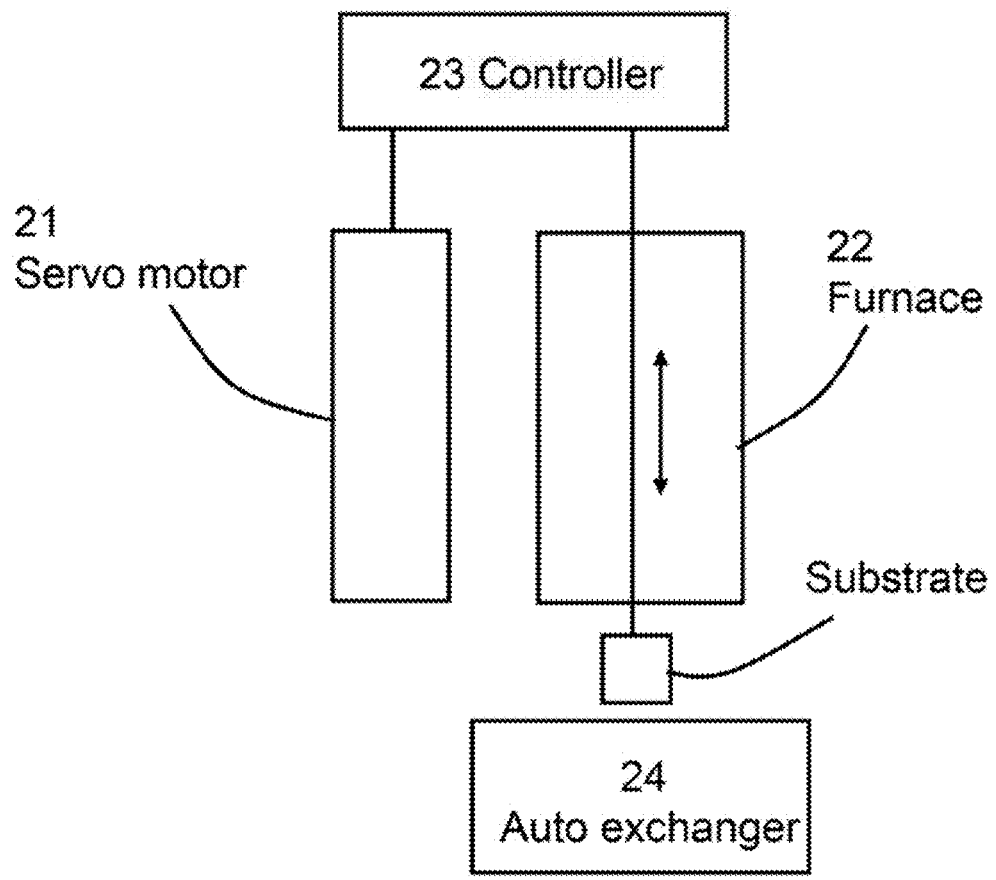
FIG. 2 is a schematic illustration of a solution coating apparatus used for fabricating the nano-composite structure in this invention.

In a preferred embodiment, the nano-composite films are fabricated by a solution coating method. The coating apparatus used for coatings in this invention is shown schematically in FIG. 2. It consists of three major parts: a driving mechanism 21, a vertical tube furnace 22, and a computerized controller 23. This apparatus is capable of multiple cycles that consist of immersing, withdrawing, drying, annealing and cooling stages. The number of cycles, the number of stages in a cycle and the motion and/or duration of each stage can all be programmed into the computer. The system is also equipped with an automated exchanger 24 for solutions of different precursors. A unique advantage of the coating process is that it can be used to grow multilayer (or superlattice) materials conveniently by dipping the substrate into different chemical precursors each time.

In this technique, solutions of individual metal-organic compounds are mixed at the desired cation ratios to form a coating solution. This coating solution is deposited on a substrate by dip-coating, or spray coating, or spin coating, to produce a wet film, which is then heated to first remove any solvent that did not evaporate during the deposition step and then to decompose the metal-organic compounds to produce an inorganic film. For most applications, the first consideration for an adequate film forming process is the ability to produce a final crack-free film. Solution-derived films tend to form cracks with increasing thickness owing to the high volume shrinkage as organic materials are removed during the firing process. This is especially true for films requiring a high-temperature treatment for crystallization. Not only is there another volume shrinkage accompanying the amorphous-to-crystalline transformation but factors like thermal expansion mismatch between the film and the substrate also become more severe as the processing temperature increases.

Similar solution coating methods include spin-coating and spray coating.

Figure 3:
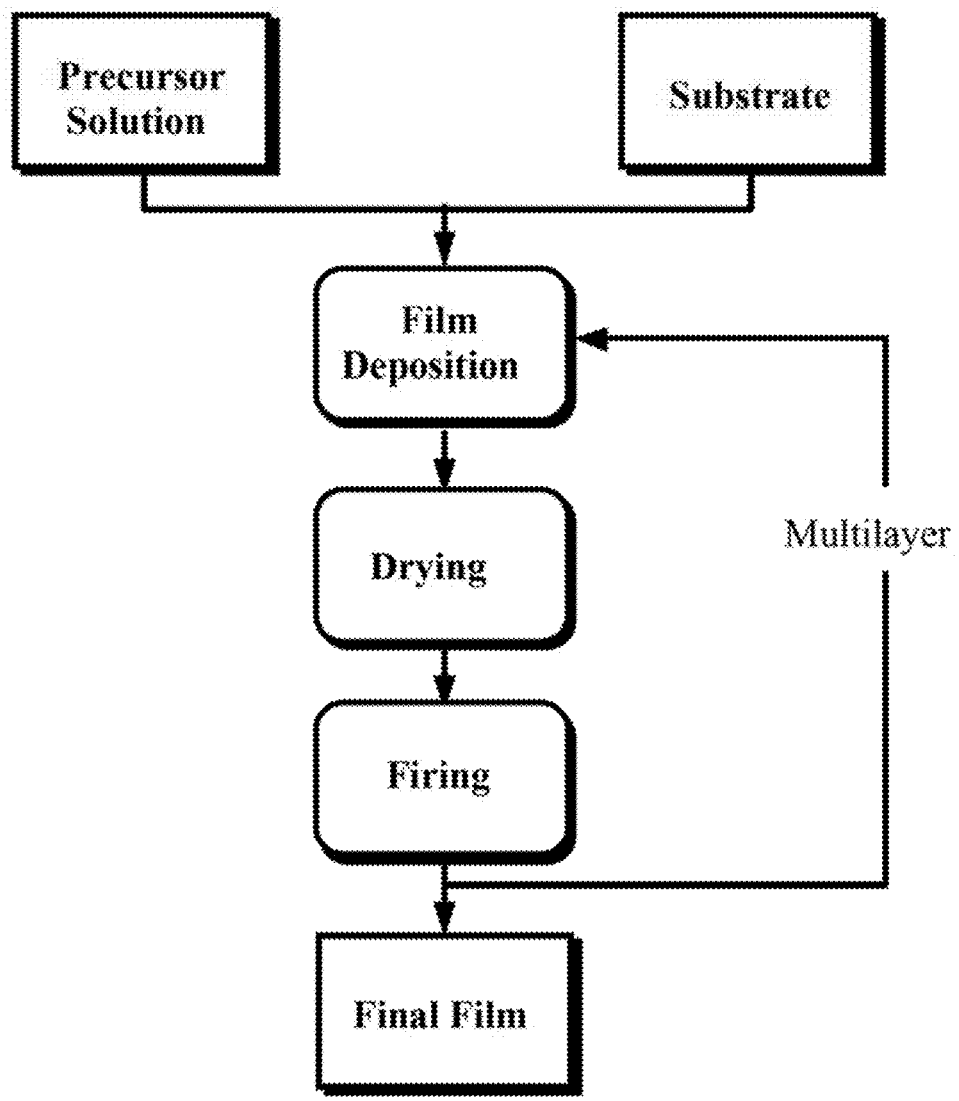
FIG. 3 is a flow chart explaining a process of manufacturing the films.

A typical flow chart for depositing films front solutions by multiple dipping is shown in FIG. 3. The temperature cycling nature of the solution coating process (by repeated heating and cooling for each layer) significantly reduces the stress due to thermal expansion mismatch between the substrate and film materials.

In one of the preferred embodiments, the nano-composite material PLZT has a general formula $Pb_{1-z}La_z[Er_yYb_w(Zr_xTi_{1-x})_{1-3(y+w)/4-z/4}]O_3$, wherein x is between about 0.05 and about 0.95, y is between about 0 and about 0.10, z is between about 0 and about 0.15, and w is between 0 and 0.50. In one especially preferred materials of the present invention, x is between about 0.55 and about 0.85, y is between about 0.01 and about 0.05, z is between about 0.07 and 0.12, and w is between 0.1 and 0.5.

PLZT is the most common electro-optic ceramic material. PLZT materials can be formed to be substantially transparent to light having wavelengths in the range of visible and near infrared. Properties of PLZT compositions can be tuned by adjusting the relative amounts of lead, lanthanum, zirconium and titanium.

The coating solution for PLZT thin film is made by dissolving lanthanum acetate, lead acetate and zirconium acetate in methanol and D.I. water, with a small amount of acetic acid as stabilizer. Then stoichiometric amount of titanium diisopropoxide bis(acetylacetonate) (TLAA) is added into the solution. The viscosity and wettability are adjusted with methanol and 2-methoxyethanol. The concentration of the precursor solution is between 0.01 to 0.5M (mol/L).

With above solution, the thin film is coated on a glass substrate, the dipping speed is between 0.1-20 mm/second, preferring between 0.5 and 10 mm/second. The firing speed is between 0.1-20 mm/second, with a preferred speed between 0.5 and 10 mm/second. The nano-composite structure with a PLZT based composition is formed between temperatures about 400° C. and 600° C. The thickness of the coatings is between 100 nm to 50 μm.

In another preferred embodiment, the nano-composite films are lead titanate (PT) based nano-composite. The precursor solution for preparing the lead titanate (PT) nano-composite films is obtained by dissolving stoichiometric amount of lead acetates and titanium diisopropoxide bis(acetylacetonate) (TIAA) in methanol and acetic acid. 2-methoxyethanol and methanol are used to adjust the viscosity. Concentrations of the solutions are between 0.01 and 0.5 M (mol/L).

With above solution, the thin film is coated on a glass substrate, the dipping speed is between 0.1-20 mm/second, preferring between 0.5 and 10 mm/second. The firing speed is between 0.1-20 mm/second, with a preferred speed between 0.5 and 10 mm/second. The nano-composite structure with a PT based composition is formed between temperatures about 300° C. and 500° C. significant lower than that for the PLZT materials. The thickness of the coatings is between 100 nm to 50 μm.

In yet another preferred embodiment, the composition of the nanocomposite material is rare earth elements doped or codoped PLZT (lead lanthanum zirconate titanate). In a specially preferred embodiment, it is Er and Yb ions co-doped PUT.

The coating solution for Er and Yb ions co-doped PUT thin film is made by dissolving lanthanum acetate, lead acetate and zirconium acetate in methanol and D.I. water, with a small amount of acetic acid as stablizer. Then stoichiometric amount of titanium diisopropoxide bis(acetylacetonate) (TIAA), erbium/ytterbium nitrate are added into the solution. The viscosity and wettability are adjusted with methanol and 2-methoxyethanol. The concentration of the precursor solution is between 0.01 to 0.5M (mol/L).

With above solution, the thin film is coated on a glass substrate, the dipping speed is between 0.1-20 mm/second, preferring between 0.5 and 10 mm/second. The firing speed is between 0.1-20 mm/second, with a preferred speed between 0.5 and 10 mm/second. The Er/Yb doped PLZT nano-composite structure is formed between temperatures about 400° C. and 600° C. The thickness of the coatings is between 100 nm to 50 μm.

Lead lanthanum titanate (PLT), or lead titanate (PT) can be used instead of the PLZT. The doping element also can be Tm and Yb ions, or Ho, Yb and Nd ions, but not limited to Sapphire, quartz, silicon, polymer, plastic, polycrystalline alumina, but not limited to, may also be used as substrate.

The composition of the nano-composite materials can also consist one of or combination of the following materials, but not limit to: lead magnesium niobate-lead titanate (PMN-PT, $(1-x)PbMn_{1/3}Nb_{2/3}O_{3-x}PbTiO_3$), lead zinc niobate-lead titanate (PZN-PT, $(1-x)PbZn_{1/3}Nb_{2/3}O_3$-$xPbTiO_3$), barium titanate ($BaTiO_3$), barium strontium titanate (BST, $Ba_xSr_{1-x}TiO_3$), strontium titanate ($SrTiO_3$), or lanthanum or other elements substituted these compounds.

Figure 4:
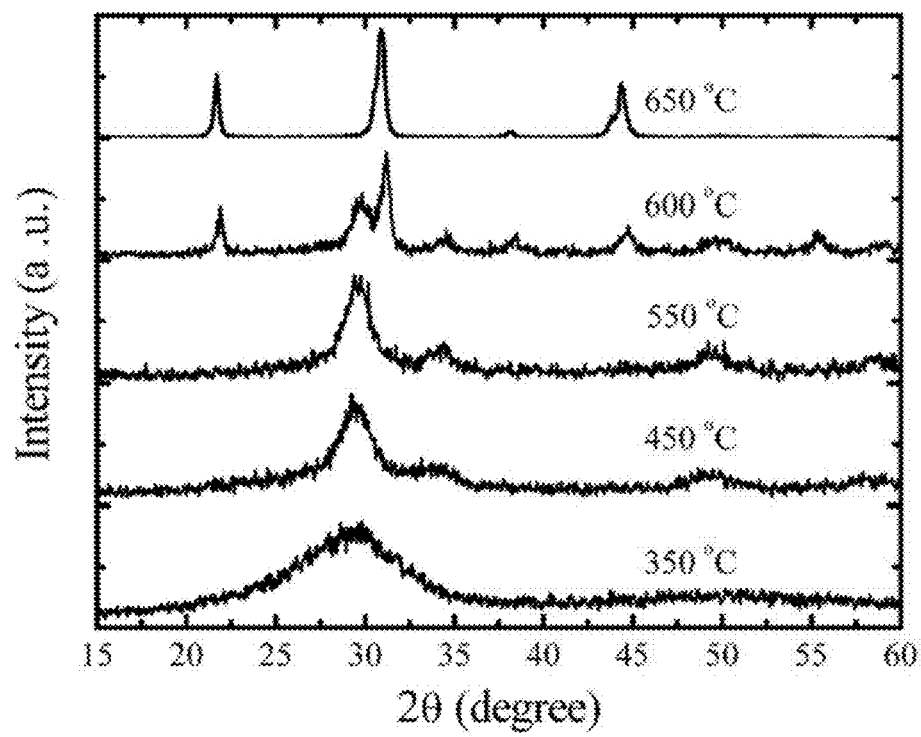
FIG. 4 is showing, a typical XRD spectrum indicating the formation process of the nano-composite structure.

Shown in FIG. 4 are XRD patterns of a PLZT:5% Er, 10% Yb thin films annealed at different temperatures, illustrating the formation process of the nano-composite structure. Films annealed at 350° C. possess an amorphous phase and have no visible upconversion luminescence detected under the 970 nm laser excitation. A nano-sized pyrochlore phase is identified in the samples annealed at temperatures from 450° C. to 550° C. These samples show large upconversion effect under a 970 nm laser excitation and exhibit high transparency. A mixture of perovskite phase and pyrochlore phase is formed in the films annealed at 600° C. The co-existence of the two phases makes the films opaque. When the annealing temperature is raised up to 650° C., the pyrochlore phase disappears and a pure perovskite polycrystalline structure is obtained, the films exhibit high transparency again. The upconversion emission intensities under the 970 nm laser excitation are in the same order in the samples annealed at 450, 550 and 650° C., when the films have similar thickness, transparency and surface morphologies. It means that the upconversion efficiency in the nanocomposite structure is as good as, if not better than that of the fully crystallized perovskite structure of PLZT.

Average sizes of the pyrochlore phase nano-crystallites have been extracted from the XRD data using Scherrer's equation as about 4 nm in the 450° C. annealed samples. The formation of the nano-crystallites embedded in an amorphous phase in the samples annealed at 450° C. has been confirmed by TEM observations. The observed average size of the nano-crystallites by TEM is in accordance with the XRD analyses. The range of the nanoparticle sizes is between 1 nm and 10 nm. It can vary between 1 nm to 300 nm depends on the composition and preparing conditions. Light scattering will not occur in such a nano-composite structure due to very small sizes of the nano-crystallites and lack of clear grain boundaries which cause a large different index change. This results a high transparent material.

Figure 5:
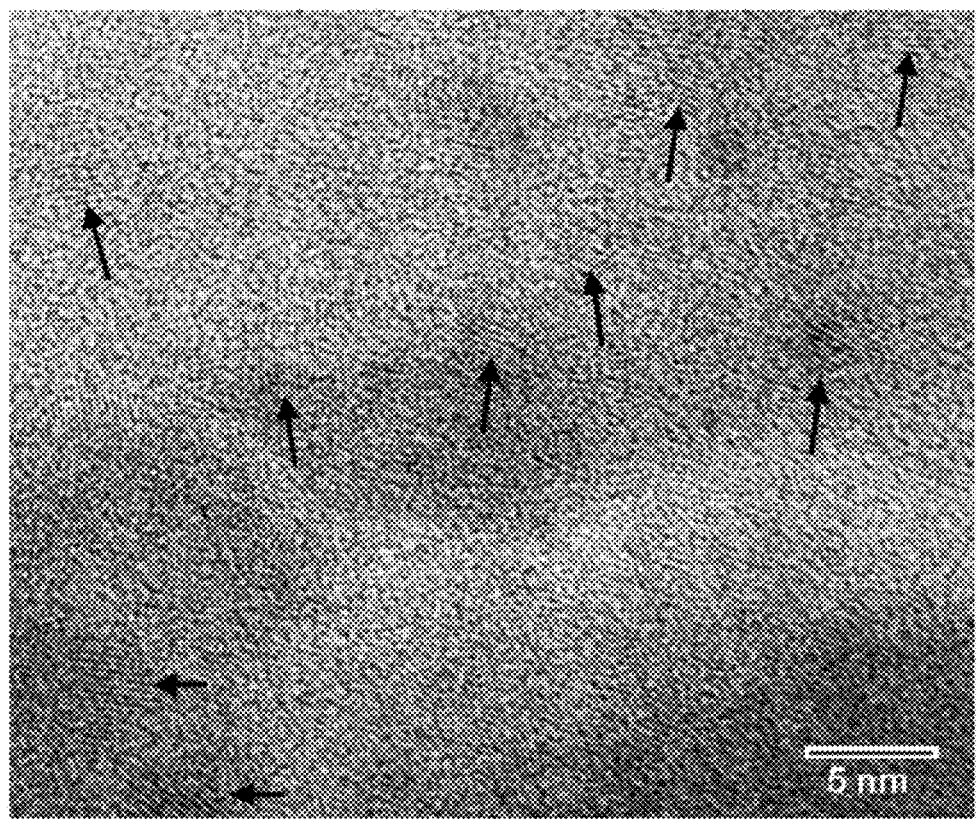
FIG. 5 is showing a typical TEM image of die nano-composite.

Shown in FIG. 5 is a typical TEM image of the nano-composite, in which the nano-crystallites (arrow positions) embed in the amorphous matrix (rest of the materials). The TEM samples are prepared by scratching off the PLZT:Er, Yb film with a blade. The fine powdery materials collected are further ground and then dispersed in ethanol.

Figure 6:
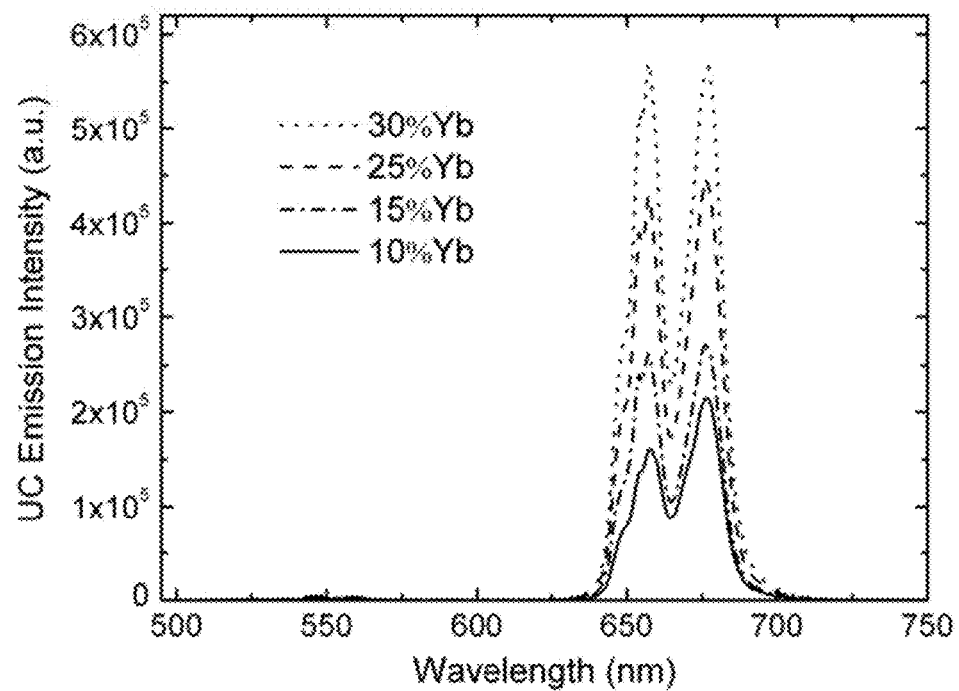
FIG. 6 is showing upconversion emission spectra of the PLZT: 5% Er, Yb glass ceramic thin films with different Yb doping concentrations.

In a preferred embodiment, nano-composite film is lanthanides doped $Pb_{1-z}La_z(Zr_xTi_{1-x})_{1-z/4}O_3$, which is an upconverting material and can convert infrared lights into visible light. Shown in FIG. 6 are upconversion emission spectra of the nano-composite films, which is transparent for visible light.

Figure 7:
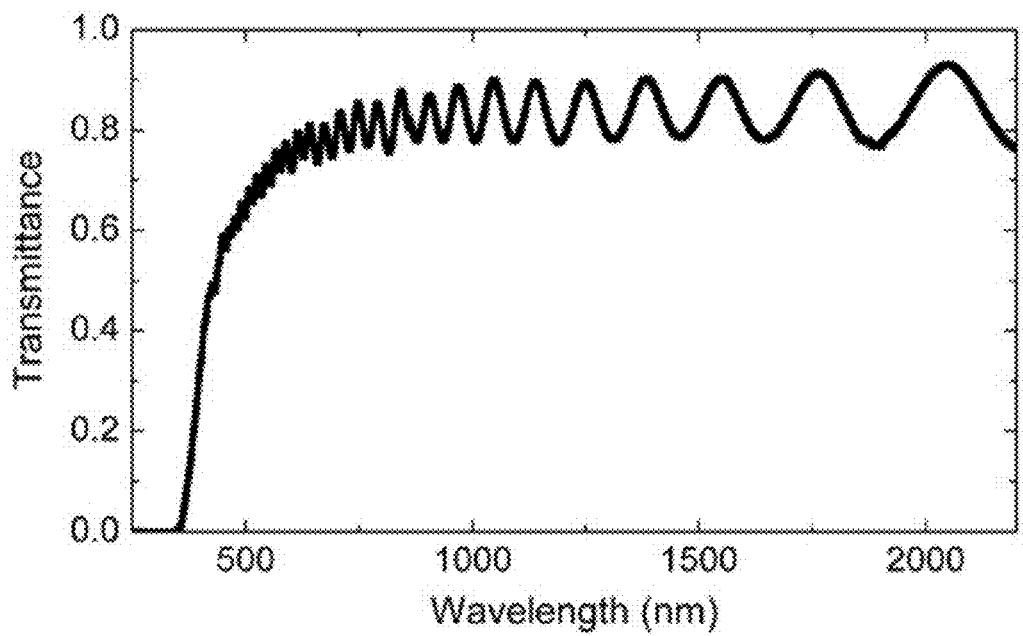
FIG. 7 is showing a transmission spectrum of a nano-composite upconversion film.
Figure 8:
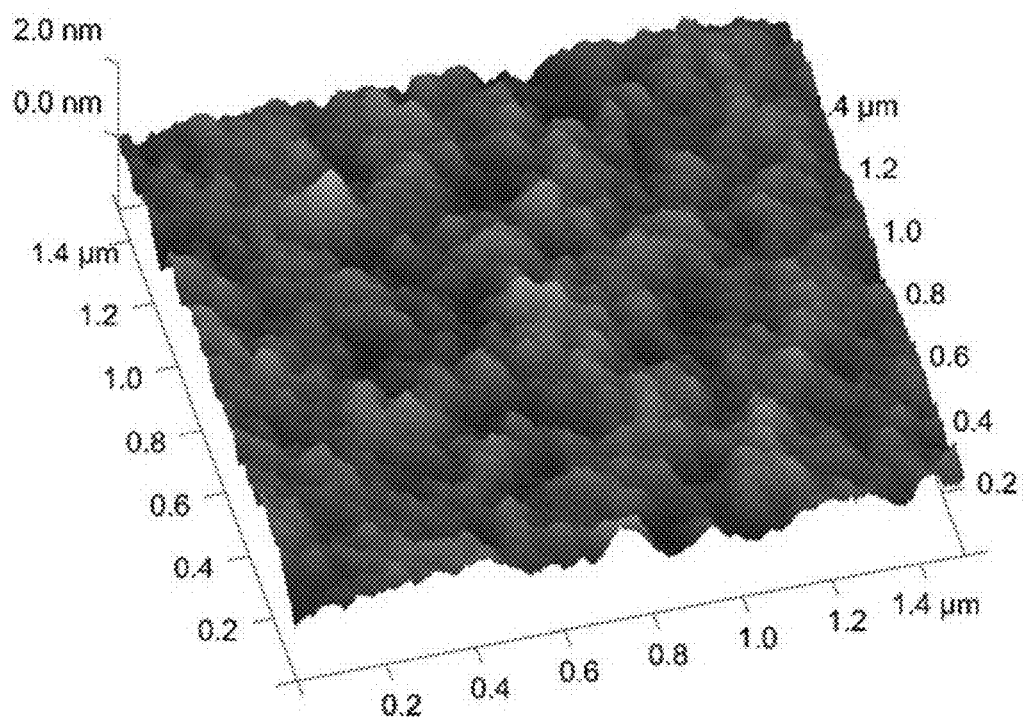
FIG. 8 is showing an AFM image of a typical nano-composite thin film surface.
Figure 9:
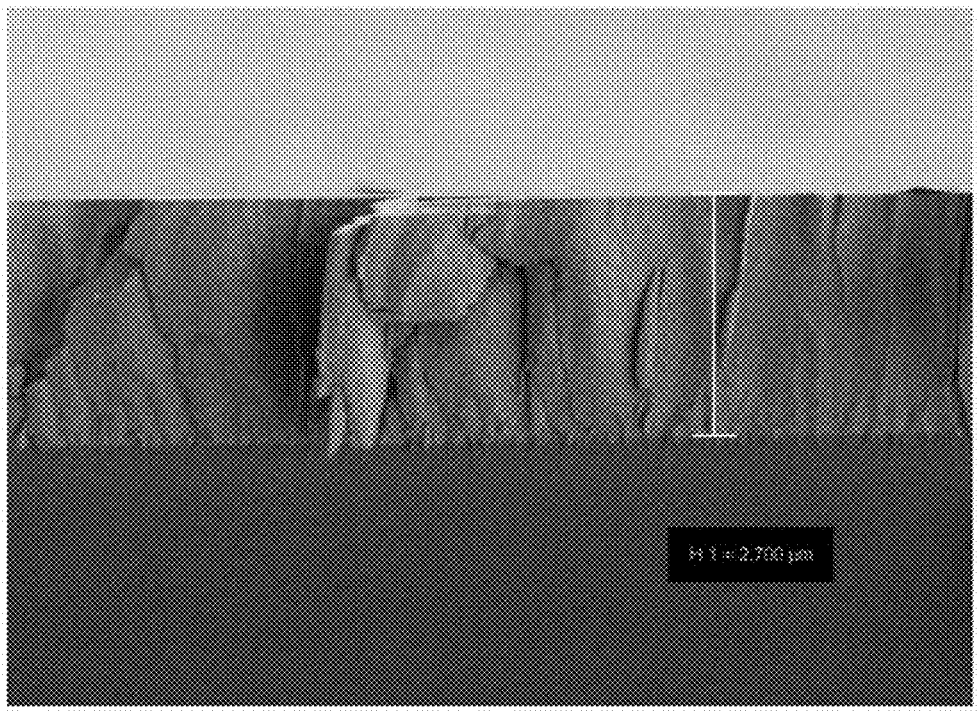
FIG. 9 is showing a cross-section image of a typical nano-composite thin film coated on c-sapphire substrate.

Shown in FIG. 7 is a transmission spectrum of the upconverting nano-composite thin film. The thickness of the film is 2 μm. It is measured using a Perkin-Elmer (Lambda 9 UV/VIS/NIR) spectrophotometer. Shown in FIG. 8 is a surface AFM (Digital Instrument: Nanoscope IV) image. The surface root square roughness of a 500 nm thick nano-composite film is 0.2 nm, indicating a very smooth surface. The coatings are also very dense. Thus they possess excellent mechanical durability and chemical stability. Cross-sectional microscopies confirmed that the bindings at substrate and film interface are very firm, as shown in FIG. 9. The fractured cross-sectional surface exhibited a seemingly columnar growth pattern and without visible voids.

Another preferred embodiment is to produce non-crystalline compound powders by heating of a solution mixture of metal salts or metalorganic compounds. The amorphous matrix in a bulk format can be made by mixing and consolidating of these non-crystalline compound powders. Then nano-crystallites can be precipated from the amorphous matrix during heat treatment to form nano-composite structure.

Yet another preferred embodiment to prepare the non-crystalline compound powders is by ball-milling of corresponding chemicals.

Although particular embodiments of the invention have been described and illustrated herein, it is recognized that modifications and variations may readily occur to those skilled in the art. For example, other film fabrication technologies can be used to make the structure, or different precursor can be used in a solution coating method.

What is claimed is:

1. A nano-composite structure comprising a nano-composite material having an amorphous matrix with embedded nano-crystallites, wherein the amorphous matrix and the nano-crystallites are made of the same chemical elements, wherein the nano-composite structure exhibits no distinguishable crystalline grain boundaries between the amorphous matrix and the nano-crystallites, wherein the nano-composite structure comprises multiple layers of nano-composite material, the multiple layers of nano-composite material disposed one directly on top of another in direct contact, and wherein each of the nano-composite layers consists of the nano-composite material.

2. The nano-composite structure in claim 1 exhibits no or small refractive index difference between the amorphous matrix and the nano-crystallites.

3. The nano-composite structure in claim 1 is dense and has few voids.

4. The nano-composite structure in claim 1 wherein a crystalline structure of the nano-crystallites includes at least one of perovskite and pyrochlore.

5. The nano-composite structure in claim 1 wherein a size of the nano-crystallites is between 1 nm and 300 nm.

6. The nano-composite structure in claim 1 wherein the amorphous matrix and the nano-crystallites include at least one of $PbTiO_3$, PLZT, PLT, PT, PMNPT, $BaTiO_3$, BST, PZNPT, or $SrTiO_3$.

7. The nano-composite structure in claim 6 wherein the amorphous matrix and the nano-crystallites further include at least one of rare earth element of Er, Yb, La, Ho, Tm, or Nd.

8. The nano-composite structure in claim 6, disposed in at least one of a high voltage device, a pulsed power device, a high energy storage device, a high power microwave system, or power electronics.

9. The nano-composite structure in claim 1 is transparent.

10. The nano-composite structure in claim 9, disposed in a display application.

11. The nano-composite structure in claim 1 exhibits photo luminescence.

12. The nano-composite structure in claim 1 is in a film that formed on a substrate with thickness between 100 nm to 50 μm.

13. The nano-composite structure in claim 12 wherein the substrate includes at least one of glass, sapphire, quartz, silicon, polymer, plastic, or polycrystalline alumina.

14. The nano-composite structure in claim 1, wherein the substrate is glass.

15. The nano-composite structure of claim 1, wherein the amorphous matrix and the nano-crystallites include at least one of PLT, PT, PMNPT, $BaTiO_3$, BST, PZNPT, or $SrTiO_3$.

16. The nanocomposite structure of claim 1, wherein the nano-crystallites are pyrochlore-phase nano-crystallites.

* * * * *